US011238709B2

(12) United States Patent
Marchais et al.

(10) Patent No.: US 11,238,709 B2
(45) Date of Patent: Feb. 1, 2022

(54) NON LINEAR PREDICTIVE MODEL FOR HAPTIC WAVEFORM GENERATION

(71) Applicant: Cirrus Logic International Semiconductor Ltd., Edinburgh (GB)

(72) Inventors: Emmanuel Marchais, Austin, TX (US); Eric Lindemann, Austin, TX (US); Carl L. Stahl, Svedala (SE)

(73) Assignee: Cirrus Logic, Inc., Austin, TX (US)

( * ) Notice: Subject to any disclaimer, the term of this patent is extended or adjusted under 35 U.S.C. 154(b) by 117 days.

(21) Appl. No.: 16/841,113

(22) Filed: Apr. 6, 2020

(65) Prior Publication Data

US 2020/0342724 A1 Oct. 29, 2020

Related U.S. Application Data

(60) Provisional application No. 62/839,042, filed on Apr. 26, 2019.

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ....... G06F 3/016; G06F 1/022; B06B 1/0261; B06B 1/045; G08B 6/00; H02K 33/00; H03F 1/0211
See application file for complete search history.

(56) References Cited

U.S. PATENT DOCUMENTS

| | | | |
|---|---|---|---|
| 2011/0075835 A1* | 3/2011 | Hill ........................ | G06F 3/016 379/418 |
| 2018/0182212 A1* | 6/2018 | Li ............................ | G06F 3/01 |
| 2018/0249986 A1* | 9/2018 | Lee ........................ | A61B 8/145 |
| 2020/0372766 A1* | 11/2020 | Biggs ...................... | H04R 3/04 |

OTHER PUBLICATIONS

U.S. Appl. No. 16/816,790, filed Mar. 12, 2020, Cirrus Logic International Semiconductor Ltd.
U.S. Appl. No. 16/369,556, filed Mar. 29, 2019, Cirrus Logic International Semiconductor Ltd.

\* cited by examiner

*Primary Examiner* — Omeed Alizada
(74) *Attorney, Agent, or Firm* — E. Alan Davis; James W. Huffman

(57) ABSTRACT

A system includes a sequencer that divides a reference waveform into reference sequences, a sequence adjuster, and a model that models non-linearities of a haptic rendering signal chain that includes a haptic transducer load and a driver to the load. For each reference sequence: the sequence adjuster transforms the reference sequence into a test sequence using one or more parameters (e.g., changes reference sequence amplitude and/or period), the model generates an output in response to the test sequence, an error signal is generated that measures a difference between the output and the reference sequence, and if the error signal is above a threshold the parameters are adjusted based on the error signal. These operations are repeated until the error signal is below the threshold in which case the test sequence becomes a selected sequence, which is then sent to the haptic rendering signal chain.

21 Claims, 5 Drawing Sheets

NON LINEAR PREDICTIVE MODEL FOR HAPTIC WAVEFORM GENERATION

CROSS REFERENCE TO RELATED APPLICATION(S)

This application claims priority based on U.S. Provisional Application, Ser. No. 62/839,042, filed Apr. 26, 2019, entitled NON-LINEAR PREDICTIVE MODEL FOR HAPTIC WAVEFORM GENERATION, which is hereby incorporated by reference in its entirety.

BACKGROUND

As is well known, haptic technology recreates the sense of touch by applying forces, vibrations, or motions to a user. Haptic devices (devices enabled with haptic technology) may incorporate tactile sensors (input transducers) that measure forces exerted by the user on a user interface (such as a button or touchscreen on a mobile telephone or tablet computer) as well as output transducers (electromechanical loads) which apply forces directly or indirectly (e.g. via a touchscreen) to a user. Taking a haptic system as an example, with a linear resonant actuator (LRA) serving as the electromechanical load, driver circuitry may be employed to drive the LRA to produce a haptic effect (such as a vibration or other tactile sensation) for a user. Audio-to-haptic conversion may also be employed for example in connection with a user playing a video game, to convert an audio signal into a corresponding haptic signal to provide a tactile sensation (output via an electromechanical load such as an LRA) alongside an audio signal (output via a speaker).

The main components of an LRA are a voice coil, a moveable magnetic mass, a spring and a casing or chassis. The magnetic mass is connected to the spring which in turn is mounted to the casing or chassis of the LRA. An alternating current (AC) voltage signal (a drive signal) is used to drive the voice coil, which is arranged to magnetically couple with the moveable magnetic mass.

More specifically, when an LRA is driven with a voltage across its two electrical terminals, a current flows through or is drawn by the voice coil (an inductor) producing an electromotive force (EMF) on the moveable magnetic mass and thus controlling its motion. The moveable magnetic mass is connected to the spring which thus also affects the motion of the mass. The moving magnetic mass in turn produces a back EMF (bemf) voltage proportional to its velocity, which is reflected at the electrical terminals. The setup is akin to a driven (damped) harmonic oscillator.

An LRA typically produces an oscillating force or vibration along an axis. When the voice coil is driven with the AC voltage signal (particularly at the resonant frequency of spring-mass arrangement), the resultant magnetic field induces movement in the magnetic mass and causes it to vibrate with a human-perceptible force. It is the vibration of the mass with a perceptible force which provides the haptic effect. Essentially, the frequency and amplitude of the AC voltage signal is converted into a vibrational frequency and amplitude of the magnetic mass connected to the spring. The LRA is thus a form of transducer. LRAs are typically highly resonant, and as such are generally driven at their resonant frequency for efficiency, i.e., to optimize the relationship between the haptic effect and power consumption.

An LRA is one example type of an electromechanical load (being an actuator or transducer), which is particularly suitable for producing a haptic effect for a user in the context of a host device, such as a portable and/or battery powered host device such as a mobile telephone, a smartphone, an audio player, a video player, a PDA, a mobile computing platform such as a laptop computer or tablet and/or a game device. Driver circuitry may be used to drive other types of electromechanical load (electromechanical device), e.g. which can be modeled as a resonant actuator such as a speaker or micro-speaker or which have non-resonant mechanical loads such as a solenoid or voice coil motor that is non-resonant.

As described above, a haptic effect may be rendered by driving a reference signal, or reference waveform, to an amplifier that drives a haptic transducer, such as an LRA. The haptic effect may be characterized by the acceleration, or velocity, or position profile of the LRA mass. It is often desirable to define the reference waveform as a target acceleration/velocity/position profile instead of a voltage waveform at the amplifier output.

Accuracy of control of actuators and transducers is important, for example in the field of haptic technology (e.g., haptic feedback). The quality of the user haptic experience is defined by the accuracy of control of the haptic transducer load, e.g., LRA. It is desirable to provide improved control (e.g. mechanical control) of an electromechanical load driven by that circuitry.

SUMMARY

In one embodiment, the present disclosure provides a system that includes a sequencer that divides a reference waveform into reference sequences, a sequence adjuster, and a model of a haptic rendering signal chain. The haptic rendering signal chain includes a haptic transducer load and a driver to the load. For each reference sequence of the reference sequences: (a) the sequence adjuster transforms the reference sequence into a test sequence using one or more parameters, (b) the model generates an output in response to the test sequence, (c) an error signal is generated that measures a difference between the output and the reference sequence, and (d) if the error signal is above a threshold, the one or more parameters are adjusted based on the error signal. Operations (a) through (d) are repeated until the error signal is below the threshold in which case the test sequence becomes a selected sequence. The selected sequence is then sent to the haptic rendering signal chain.

In another embodiment, the present disclosure provides a method for rendering a haptic effect by a haptic rendering signal chain that includes a haptic transducer load and a driver to the load, comprising dividing a reference waveform into reference sequences, and for each reference sequence of the reference sequences: (a) transforming the reference sequence into a test sequence using one or more parameters, (b) generating, by the model, an output in response to the test sequence, (c) generating an error signal that measures a difference between the output and the reference sequence, (d) if the error signal is above a threshold, adjusting the one or more parameters based on the error signal. The method also includes repeating operations (a) through (d) until the error signal is below the threshold in which case the test sequence becomes a selected sequence. The method also includes sending the selected sequence to the haptic rendering signal chain.

The model may model non-linearities of the haptic rendering signal chain. The modeled non-linearities may include driver clipping, load current distortion, load voltage distortion, load excursion limiting, force factor distortion, and/or non-linear spring compression.

DETAILED DESCRIPTION

Figure 1:
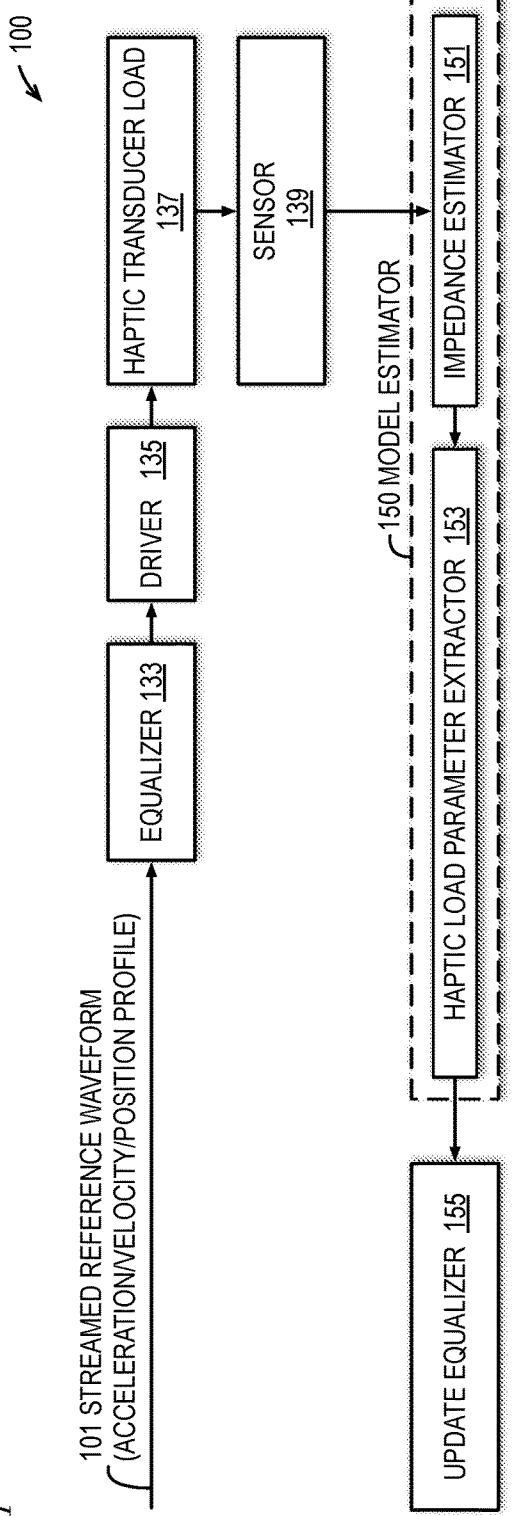
FIGS. 1 through 5 are examples of haptic effect rendering systems.

FIG. 1 is an example of a haptic effect rendering system 100. The system 100 includes an equalizer 133, a driver 135, a haptic transducer load 137 (e.g., LRA load), a sensor 139, a model estimator 150, and an equalizer update block 155. The model estimator 150 includes an impedance estimator 151 and a haptic load parameter extractor 153. The equalizer 133 receives a streamed reference waveform 101. In the example of FIG. 1, the reference waveform 101 (e.g., acceleration, velocity, or position profile) may be equalized by the equalizer 133 to generate the driver 135 voltage necessary to closely render the same effect (e.g., acceleration, velocity, position) on the haptic transducer load 137.

The equalizer 133 is a filter that may be fixed or time-varying, based on an off-line or on-line estimation (e.g., of model estimator 150) of the load 137 voltage to acceleration or bemf transfer function (TF). The equalizer filter 133 is based on a model of the plant encompassing the driver 135 and haptic transducer load 137. A sensor 139 senses the voltage across the load 137 and the current drawn by the load 137. The sensed load voltage and current are provided to the impedance estimator 151, which estimates the impedance of the load 137 and provides the estimate to the haptic load parameter extractor 153. The haptic load parameter extractor 153 extracts parameters of the load 137, such as resonant frequency, quality factor (Q), electrical resistance, inductance and capacitance, and mechanical resistance, inductance and capacitance. The update equalizer block 155 updates the coefficients of the equalizer 133 based on the extracted parameters and impedance estimate. The model estimator 150 may be a least-squares method (LSM), for example, to obtain the plant model.

Figure 2:
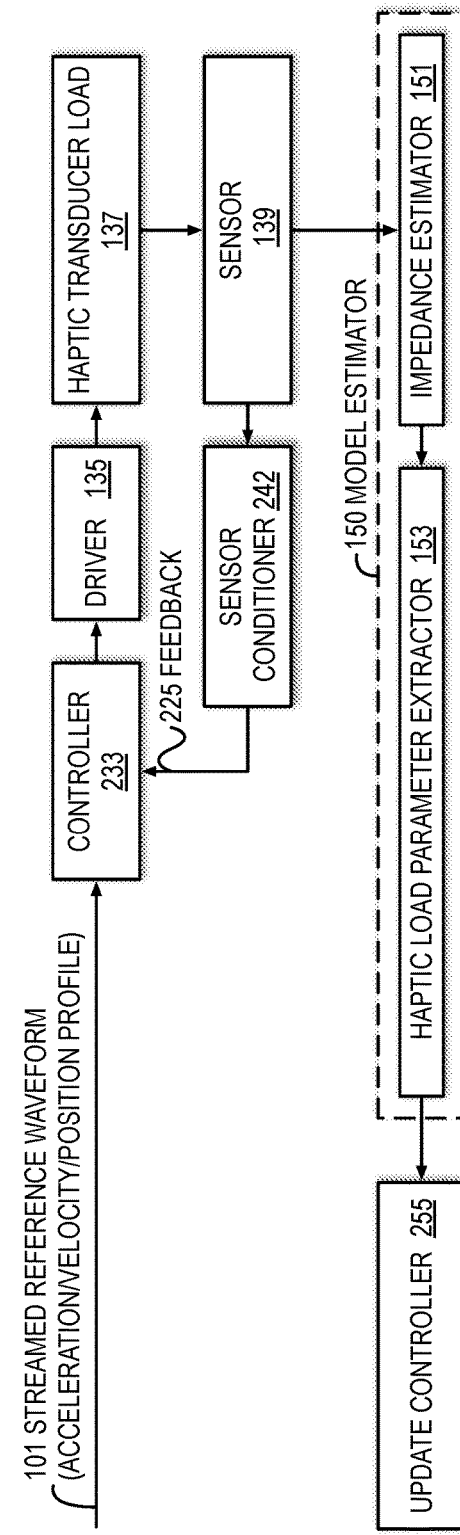

FIG. 2 is another example of a haptic effect rendering system 200. The system 200 of FIG. 2 is similar in many respects to the system 100 of FIG. 1. However, instead of an equalizer, the system 200 includes a closed-loop controller 233 that receives the reference waveform 101 and feedback 225 from a sensor conditioner 242. The sensor conditioner 242 conditions the load voltage and/or current sensed by the sensor 139 to generate the feedback 225. In one embodiment, the controller 233 synthesizes a negative impedance corresponding to a coil impedance, e.g., of an LRA, the target reference waveform 101 is a bemf voltage, and the feedback 225 is the conditioned load current. In another embodiment, the feedback 225 is an estimate of the actual waveform produced by the haptic transducer load 137. For instance, the estimate 225 may be a velocity that is proportional to a bemf estimate derived from the sensed load voltage and current. In this embodiment, the controller 233 compares the reference waveform 101 to the estimate 225. The controller 233 parameter may be the estimate of the LRA coil DC impedance obtained from the on-line load model estimator 150. Additionally, an update block 255 updates the coefficients of the controller 233 based on the extracted parameters and impedance estimate from the model estimator 150.

The embodiments of FIGS. 1 and 2 are described at least in part in U.S. Non-Provisional application Ser. No. 16/816,790, entitled "Methods and Systems for Improving Transducer Dynamics," filed Mar. 12, 2020, which claims priority to U.S. Provisional Application Ser. No. 62/826,348, entitled "Method and Apparatus for Improving Transducer Dynamics," filed on Mar. 29, 2019; and U.S. Non-Provisional application Ser. No. 16/369,556, entitled "Driver Circuitry," filed on Mar. 29, 2019, each of which is incorporated by reference herein in its entirety for all purposes. The embodiments of FIGS. 1 and 2 may work reasonably well as long as linear operation is maintained through the signal chain. It may be desirable however to bring the driver 135 and haptic transducer load 137 into a non-linear mode of operation in order to maximize the haptic effect.

As the amplitude of the reference waveform 101 is increased, the equalizer 133 or the control loop 233 may produce voltage outputs larger than the driver 135 can deliver. As the driver 135 clips, the acceleration produced will not match the target acceleration. If an equalizer 133 is used, the produced acceleration profile may be significantly altered. If a closed-loop controller 233 is used, the controller 233 will attempt to recover some of the error introduced by clipping. If too much clipping occurs, the controller 233 may become unstable. In general, when clipping occurs, these solutions lead to an altered produced acceleration that may not have desirable properties.

Embodiments are now described which make use of a model of the plant response, including filters, amplifier, actuator and sensing element, that includes their non-linear or limiting effects. The model is run to simulate the predicted acceleration waveform produced in response to the reference waveform. If the simulated acceleration substantially matches the reference acceleration, or an acceptable adjustment/transformation of the reference acceleration, the transformed reference waveform is played back through the actual plant. On the other hand, if the simulated acceleration does not substantially match the reference acceleration, the waveform is adjusted/transformed (e.g. parameters of a parametric transformation of the reference waveform are modified) and the adjusted reference waveform is simulated. The process is repeated until a good candidate adjusted reference waveform has been found.

To accommodate real-time streaming of the input reference waveform in the presence of the iterative modeling of the plant just described, the system is modified to include an input buffer, a sequencer and a ping-pong output buffer. The input buffer keeps the sequencer pipeline fed. The sequencer divides the waveforms into chunks, or reference sequences, that may be simulated independently. For instance, the sequencer may divide the reference waveform into individual cycles limited by zero-crossings. When a reference sequence is available, it is sent to a first output buffer that is used repeatedly by the model to run simulations of the plant, e.g., in an iterative fashion that adjusts the reference sequence each iteration. When a valid candidate reference sequence has been found, the buffer is then used for playback by the actual plant. In the meantime, a second output buffer ping-pongs with the first buffer to receive and simulate the next reference sequence.

The parametric transformation, also known as sequence adjustment, may be a limiter, for example. For example, the sequence adjustment may adjust the reference sequence amplitude in a linear or non-linear way.

With a proper adjustment function, the method may lead to produced acceleration profiles that are reasonably close to a target reference acceleration waveform, even at high amplitude levels. The method may allow compressing the reference waveform to more frequently utilize the full swing of the amplifier, resulting in a fuller haptic experience.

Figure 3:
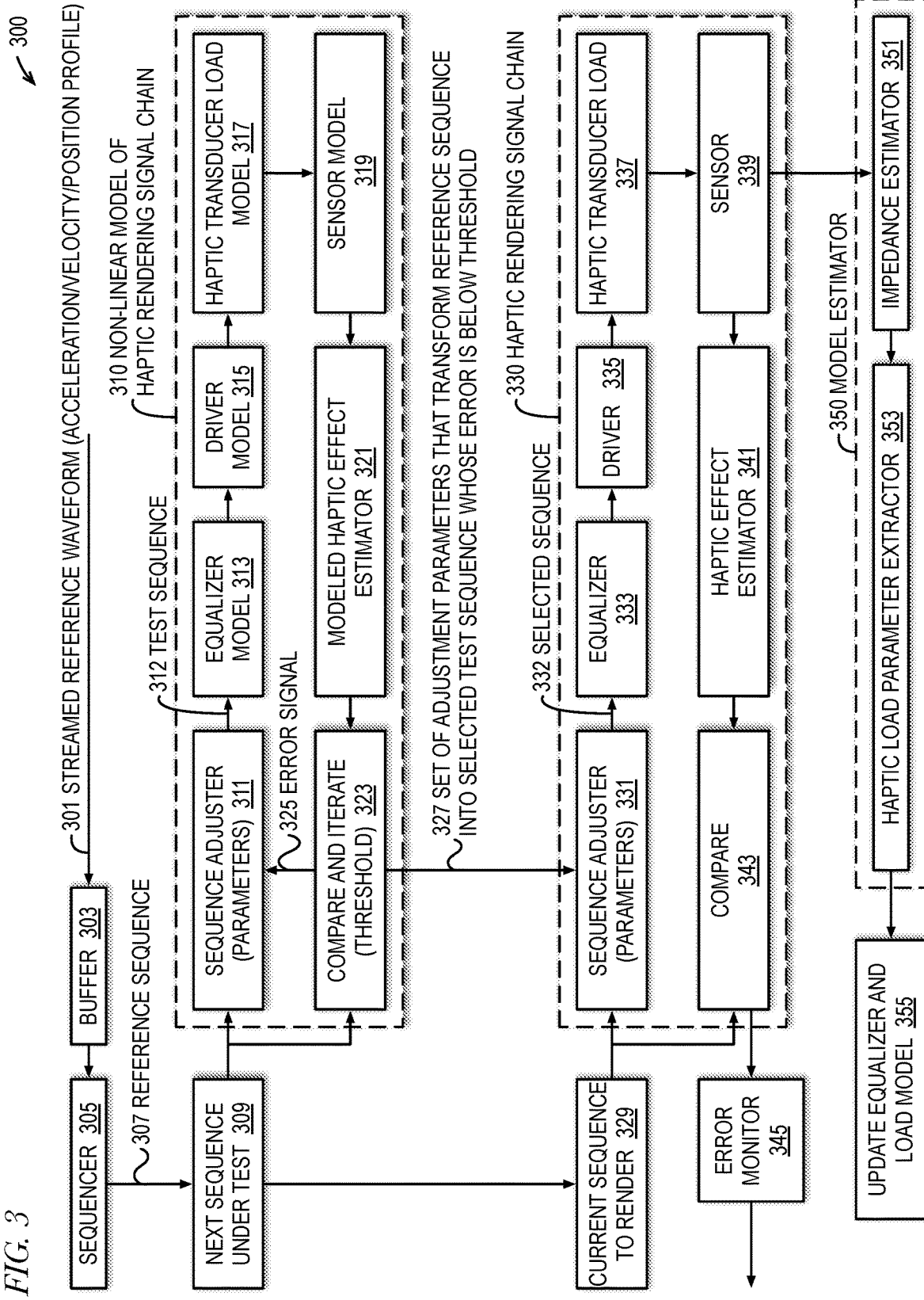

FIG. 3 is an example of a haptic effect rendering system 300 in accordance with embodiments of the present disclosure. In the embodiment of FIG. 3, the adjusted sequence is passed through an equalizer that compensates the dynamics of the plant (e.g., amplifier and actuator) from the reference acceleration to the actual acceleration. The equalizer coefficients are determined from an off-line or on-line estimate of the plant.

Some elements of the system 300 of FIG. 3 are similar to those of FIGS. 1 and 2. However, some corresponding elements are different, as described, and additional elements are included in the system 300 of FIG. 3. The system 300 includes a buffer 303, a sequencer 305, a next sequence to render buffer 309, a current sequence to render buffer 329, an error monitor 345, and a model of the haptic rendering signal chain 310, which are included in the systems 100 and 200 of FIGS. 1 and 2. The system 300 includes a haptic rendering signal chain 330 and a model estimator 350. The haptic rendering signal chain 330 of FIG. 3 also includes a sequence adjuster 331, a haptic effect estimator 341, and a compare block 343 that are not included in the systems 100 and 200 of FIGS. 1 and 2. The haptic rendering signal chain 330 includes the sequence adjuster 331, an equalizer 333, a driver 335 (or amplifier 335), a haptic transducer load 337, a sensor 339, the haptic effect estimator 341, and the compare block 343. In one embodiment, the driver 335 is a class-D amplifier. The driver 335 may operate in a voltage control or a current control mode. In one embodiment, the driver 335 may have a class-H control, i.e., variable supply rail, to improve efficiency. In such an embodiment, the supply rail waveform may be a parameter of the sequence adjuster 311 or may be computed a posteriori after knowing the driver model 315 requested voltage. Such an embodiment may be an improvement over an embodiment that has a low latency loop requirement and therefore cannot take advantage of a class-H control.

The haptic rendering signal chain model 310 includes a sequence adjuster 311, a model 313 of the equalizer 333, a model 315 of the driver 335, a model 317 of the haptic transducer load 337, a model 319 of the sensor 339, an estimator 321 of a modeled haptic effect generated by sensor model 319, and a compare and iterate block 323. The sequence adjuster 311 includes parameters, and the compare and iterate block 323 includes a threshold, whose uses are described in more detail below. In one embodiment, the haptic transducer load 337 is an LRA, although other haptic transducer loads may be employed such as an eccentric rotating mass (ERM) vibration motor.

The buffer 303 receives a streamed reference waveform 301. The streamed reference waveform 301 may be an acceleration profile, a velocity profile, a position profile, a bemf profile, or other profile of a target haptic effect, i.e., desired haptic effect, to be rendered by haptic transducer load 337, such as a vibration or other tactile sensation for a user. The streamed reference waveform 301 is generated by a real-time process and streamed to the system 300. An example of the real-time process is a user playing a video game running on a device in which an audio signal is converted into a corresponding haptic signal, e.g., streamed reference waveform 301, which the system 300 renders as a tactile sensation, more specifically a haptic effect rendered by the haptic transducer load 337. In such an example, the streaming reference waveform 301 may change dynamically in response to different input given by the user, for example.

This is in contrast to a static haptic effect such as the vibration of a cell phone associated with a ringtone, for example, to indicate an incoming telephone call or text message that is fixed in nature such that the parameters of the equalizer 333 needed to render a haptic effect that matches the fixed reference waveform may be determined offline a priori, e.g., in a laboratory during development time rather than real-time during use of the device by a user. However, even in the example of a ringtone, the embodiments described may provide a benefit because, even the ringtone reference target is known in advance, the properties of the haptic transducer load 337 may change based on environmental conditions such that adjustment parameters determined a priori, e.g., in a development laboratory, may not be optimum in a field setting. Another example of the real-time process is an audio-to-haptic rendering process in which a streamed audio signal, e.g., part of an audio-visual stream such as an online video stream, is rendered through speakers while simultaneously being enhanced with haptic effects, for instance to improve the feeling of bass-notes, or percussive sounds, occurring in the audio stream.

The buffer 303 buffers the streamed reference waveform 301 and provides it to the sequencer 305 as needed. The sequencer 305 divides the buffered reference waveform 301 into smaller reference sequences. For example, the sequencer 305 may break the reference waveform 301 into individual reference sequences each of which is a single cycle or small number of cycles, e.g., separated by zero-crossings of the reference waveform 301. The buffer 303 is sufficiently large to accomplish real-time operation of the haptic rendering signal chain 330 while using an iterative process of parametrically adjusting a test sequence of the streamed reference waveform 301 and modeling a haptic effect in response to the adjusted test sequence by using the haptic rendering signal chain model 310 until a test sequence has an acceptably low error relative to the reference sequence, as described in more detail below. As the sequencer 305 extracts a reference sequence 307 from the streamed reference waveform 301, the sequencer 305 provides the reference sequence 307 to the next sequence under test buffer 309, which provides the reference sequence 307 to the sequence adjuster 311 and to the comparator block 323.

The sequence adjuster 311 uses its parameters to adjust, or transform, the reference sequence 307 provided from the next sequence under test buffer 309 into a test sequence 312 that is provided to the equalizer model 313. Examples of the parameters used to transform the reference sequence 307 into the test sequence 312 include compression or expansion of the sequence amplitude, time compression or expansion of the sequence samples (e.g., adjustment of the period of each cycle within the sequence), or distortion of the sequence that may include a clipping level. In one embodiment, the reference sequence 307 may be a cycle that has an amplitude and period, and the sequence adjuster 311 uses the parameters to adjust the amplitude and/or period of the reference sequence 307. Each iteration, the sequence adjuster 311 may adjust its parameters that it uses to transform the reference sequence 307 based on an error signal 325 received from the compare and iterate block 323, which is described in more detail below.

The equalizer model 313 equalizes the adjusted test sequence 312 to output an input to the driver model 315. The equalizer model 313 uses the coefficients of the equalizer 333, which may be determined from an offline estimate of the driver 335 and haptic transducer load 337 or from an online estimate such as produced by the model estimator 350, as described below. The input to the driver model 315 models the input voltage to the driver 335.

The driver model 315 amplifies the input voltage representation and outputs to the haptic transducer load model 317 a representation of an amplified voltage that models the input to the haptic transducer load 337. Advantageously, the driver model 315 models non-linearities of the driver 335, such as clipping induced by voltage outputs larger than the driver 335 can deliver. Modeling the non-linearities of the driver 335 for use in iteratively determining an acceptable test sequence 312 may advantageously result in a rendered haptic effect with more desirable properties than a conventional solution such as that of FIG. 1, i.e., that more closely matches the target specified by the reference waveform 301.

The haptic transducer load model 317 models the haptic transducer load 337 and outputs to the sensor model 319 a representation of the haptic effect rendered by the haptic transducer load 337. For example, in the case of an LRA, the sensor 339 may include a voltage monitor and a current monitor that measure a load voltage and a load current, respectively, of the haptic transducer load 337, in which case the sensor model 319 receives from the haptic transducer load model 317 a representation of the monitored load voltage and load current and models the sensor 339 to output a sensed load voltage and load current as simulated by the sensor model 319. Advantageously, the haptic transducer load model 317 models non-linearities of the haptic transducer load 337, such as excursion limits, force factor distortion, non-linear spring compression. Modeling the non-linearities of the haptic transducer load 337 for use in iteratively determining an acceptable test sequence 312 may advantageously result in a rendered haptic effect with more desirable properties than a conventional solution such as that of FIG. 1, i.e., that more closely matches the target specified by the reference waveform 301.

The modeled haptic effect estimator 321 takes the modeled load voltage and current received from the sensor model 319 and outputs an estimation of the haptic effect rendered by the haptic transducer load model 317, e.g., a representation of an acceleration, velocity, position profile of the mass of the haptic transducer load 337, e.g., of an LRA, or a bemf of the load 337. The compare and iterate block 323 computes a difference between the haptic effect estimate received from the modeled haptic effect estimator 321 and the reference sequence 307 received from the next sequence under test buffer 309 to generate an error signal 325, which is provided to the sequence adjuster 311.

If the error signal 325 is below the threshold, then the test sequence 312 becomes a selected test sequence 332 that is acceptable for playback by the actual haptic rendering signal chain 330, the reference sequence is copied to the current sequence to render buffer 329 from the next sequence under test buffer 309, and the next reference sequence 307 is loaded into the next sequence under test buffer 309 so it may be subsequently iteratively adjusted by the sequence adjuster 311 and simulated by the model 310 until a test sequence 312 whose associated error signal 325 is below the threshold is obtained, as described herein. In one embodiment, to accomplish playback of the selected sequence 332 by the haptic rendering signal chain 330, the set of adjustment parameters 327 that was used by the sequence adjuster 311 to adjust the reference sequence 307 to produce the selected test sequence is passed to the sequence adjuster 331, and the reference sequence is sent from the next sequence under test buffer 309 to the current sequence to render buffer 329 and then provided to the sequence adjuster 331. The sequence adjuster 331 then uses the received set of parameters 327 to transform the reference sequence received from the current sequence to render buffer 329 into the selected sequence 332, which is provided to the equalizer 333. In an alternate embodiment, the selected test sequence 332 is passed directly to the equalizer 333 of the haptic rendering signal chain 330. In such an embodiment, the sequence adjuster 331 may not be needed, and an additional buffer (not shown) may be employed to buffer the current test sequence 312 and provide it directly to the equalizer 333 as the selected sequence 332 when the compare and iterate block 323 indicates the error signal 325 is below the threshold.

However, if the error signal 325 is above the threshold, then the sequence adjuster 311 adjusts its parameters so that it can adjust the reference sequence received from the next sequence under test buffer 309 during the next iteration to produce a different test sequence 312 from the previous iteration.

The model estimator 350 includes an impedance estimator 351 and a haptic load parameter extractor 353. When the selected sequence 332 is played back by the haptic rendering signal chain 330, the sensor 339 provides the sensed load voltage and load current to the haptic effect estimator 341 and to the impedance estimator 351. The impedance estimator 351 estimates the impedance of the haptic transducer load 337, which is also provided to the haptic load parameter extractor 353. The haptic load parameter extractor 353 extracts parameters of the haptic transducer load 337, such as resonant frequency of the electromechanical load, bandwidth of the electromechanical load, quality factor (Q), electrical resistance and inductance of a coil of the electromechanical load, a resonant amplitude of a capacitive-inductive tank of the mechanical load, and mechanical resistance, inductance and capacitance. See FIG. 6 for an electrical circuit equivalent of an example of a haptic transducer load, such as haptic transducer load 337. The system 300 also includes an update block 355 that updates parameters of the haptic transducer load model 317 that are provided by the haptic load parameter extractor 353. The update block 355 may also update coefficients of the equalizer 333.

The haptic effect estimator 341 takes the measured load voltage and current received from the sensor 339 and outputs an estimation of the haptic effect rendered by the haptic transducer load 337, e.g., a representation of an acceleration, velocity, position profile of the mass of the haptic transducer load 337 (e.g., of an LRA) or a bemf of the load 337. The haptic effect estimator 341 provides the haptic effect estimate to the compare block 343. The compare block 343 computes a difference between the haptic effect estimate received from the modeled haptic effect estimator 341 and the reference sequence received from the current sequence to render buffer 329 to generate an error signal that is provided to the error monitor 345. If the error signal is above a threshold, the error monitor 345 reports to the device (e.g., CPU running operating system of the device) that the system 300 has failed to render a haptic effect that sufficiently matches the target reference waveform 307.

Advantageously, by modeling the haptic rendering signal chain 330 and adjusting the reference waveform 307, in an iterative fashion based on an error between the reference waveform 307 and an estimate of the haptic effect rendered by the model 310, the system 300 may render haptic effect profiles that are reasonably close to the target reference waveform 307, even at high amplitude levels. Further advantageously, the buffer 303, sequencer 305 and sequence buffers 309 and 329 operate to accommodate real-time streaming of the input reference waveform 307 in the presence of the iterative modeling of the haptic rendering signal chain 330 as described above.

Figure 4:
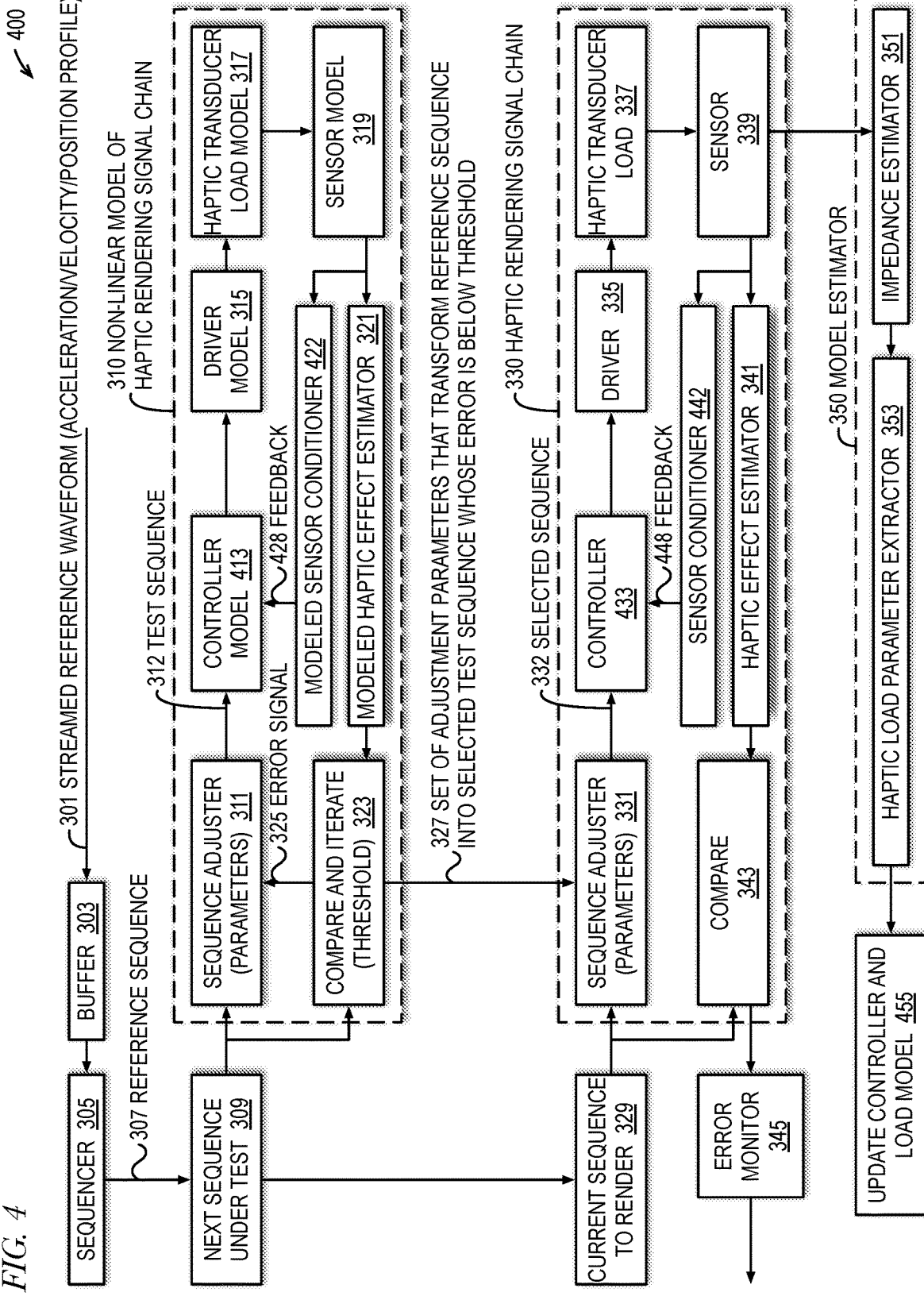

FIG. 4 is an example of a haptic effect rendering system 400 in accordance with embodiments of the present disclosure. In the embodiment of FIG. 4, the adjusted sequence (selected sequence) becomes the reference input to a closed-loop feedback system. A controller filters the error between the reference input and a sensed output to generate the driving signal. The controller dynamics are tuned using knowledge of an off-line or on-line estimate of the plant.

The system 400 of FIG. 4 is similar in many respects to the system 300 of FIG. 3. However, the system 400 of FIG. 4 includes a controller 433 and a controller model 413 that replace the equalizer 333 and equalizer model 313, respectively, of FIG. 3. Additionally, the information estimated by the model estimator 350 is used by the update block 455 to update the coefficients of the controller 433 and controller model 413 rather than of an equalizer. The controller 433 receives the selected sequence 332 from the sequence adjuster 331 and feedback 448 from a sensor conditioner 442. The sensor conditioner 442 conditions the load voltage and/or current sensed by the sensor 339 to generate the feedback 448. A controller model 413 receives the test sequence 312 from the sequence adjuster 311 and feedback 428 from a modeled sensor conditioner 422. The modeled sensor conditioner 422 conditions the modeled load voltage and current received from the sensor model 319 to generate the feedback 428. The controller 433 filters the difference between the selected sequence 332 and the feedback 448 to generate the signal it outputs to the driver 335, and the controller model 413 filters the difference between the test sequence 312 and the feedback 428 to generate the signal it outputs to the driver model 315. In one embodiment, the controller 433 synthesizes a negative impedance corresponding to a coil impedance (e.g., of an LRA), and the feedback 448 is the conditioned load current. In another embodiment, the feedback 448 is an estimate of the velocity produced by the haptic transducer load 337, which is proportional to a bemf estimate derived from the sensed load voltage and current.

In a manner similar to that described above with respect to FIG. 3, the sequence adjuster 311 uses its parameters to adjust the reference sequence 307 provided from the next sequence under test buffer 309 into a test sequence 312 that is provided to the controller model 413, and each iteration the sequence adjuster 311 may adjust its parameters that it uses to transform the reference sequence 307 based on the error signal 325 received from the compare and iterate block 323. The controller model 413 filters the adjusted test sequence 312 to drive the driver model 315. The controller model 413 uses the coefficients of the controller 433 to filter the selected sequence 332 to drive the driver 335. As with FIG. 3, advantageously, the driver model 315 models non-linearities of the driver 335 and the haptic transducer load model 317 models non-linearities of the haptic transducer load 337, and the compare and iterate block 323 and sequence adjuster 311 operate to accomplish iterative modeling based on determination of an acceptable value of the error signal 325 to determine acceptable test sequences 312 for playback by the haptic rendering signal chain 330, which may enable the system 400 to render haptic effect profiles that are reasonably close to the target reference waveform 307, even at high amplitude levels. Additionally, by modeling the haptic rendering signal chain 330 and adjusting the reference waveform 307 in the iterative fashion, the system 400 may advantageously render a more desirable haptic effect. Further advantageously, the buffer 303, sequencer 305 and sequence buffers 309 and 329 may operate to accommodate real-time streaming of the input reference waveform 307 in the presence of the iterative modeling.

Figure 5:
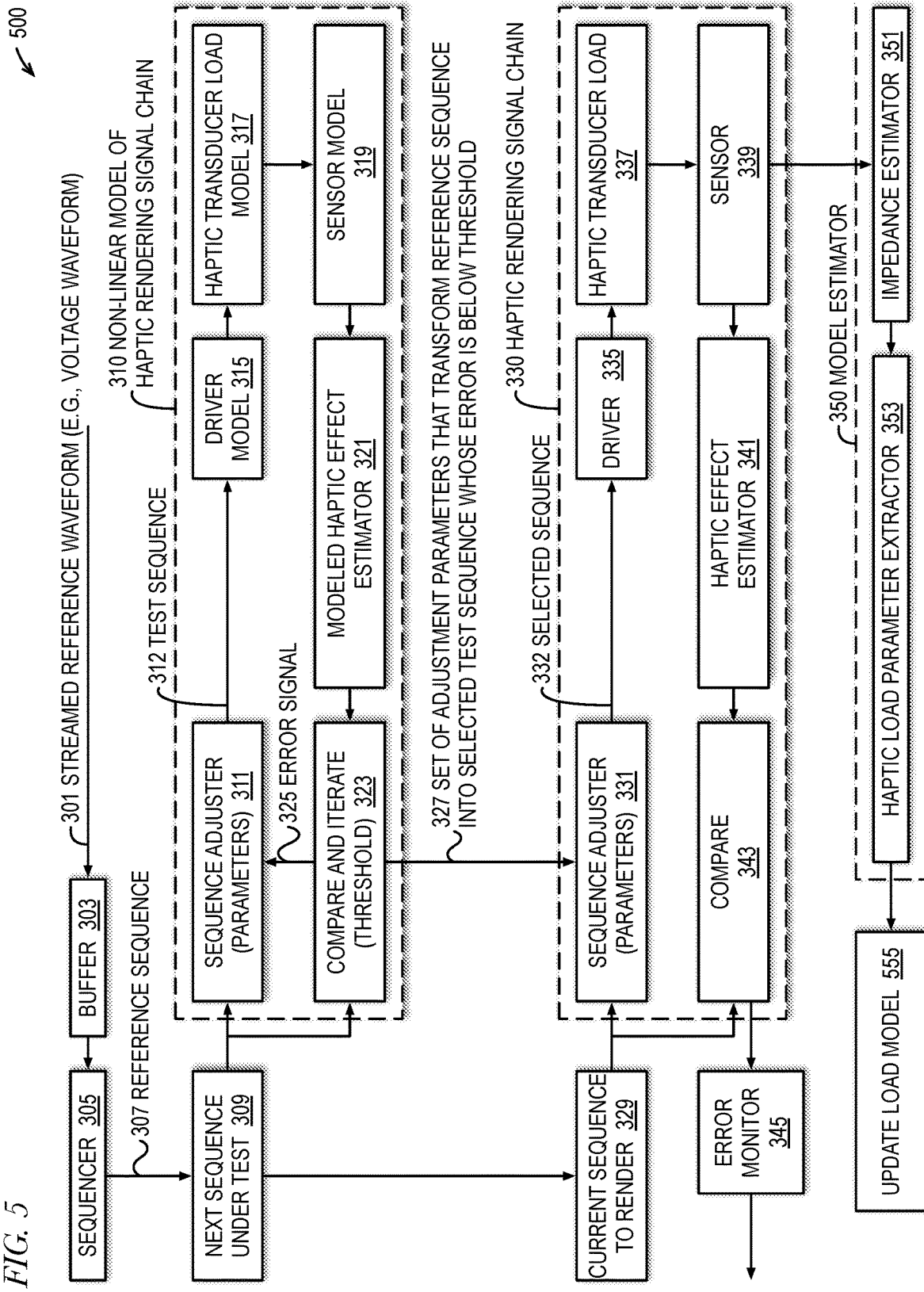

FIG. 5 is an example of a haptic effect rendering system 500 in accordance with embodiments of the present disclosure. In the embodiment of FIG. 5, the reference waveform may be a voltage waveform. Controlling the amplifier voltage is advantageous to maximize use of the amplifier voltage swing, hence maximizing power transfer to the load. Controlling the amplifier voltage may be advantageous when the voltage supply of driver 335, rather than the mass excursion of transducer 337, is limiting the strength of the haptic effect. In the embodiment of FIG. 5, the waveform may be described as either driving cycles (power into the actuator) or braking cycles (power out of the actuator). In driving cycles, the simulation tests whether at the end of a cycle, the modeled load current and bemf estimate are in phase. In braking cycles, the simulation tests for an out-of-phase condition. In either case, the candidate sequence amplitude or frequency may be adjusted to drive towards the desired goal. The sequence adjuster 311 may adapt its parameters to attempt to maximize the output voltage of driver model 315 in each cycle, while ensuring that the modeled load current and bemf are either in phase (driving cycle) or out of phase (braking cycle). This maximizing of the output voltage may result in the crispest haptic transducer waveform that may be achieved given the power constraint of driver 335.

The system 500 of FIG. 5 is similar in many respects to the system 300 of FIG. 3. However, the system 500 of FIG. 5 does not include the equalizer 333 and equalizer model 313 of FIG. 3. Additionally, rather than an acceleration/velocity/position profile, the streamed reference waveform 301 is a voltage waveform or a current waveform for driving, after being sliced and adjusted, the driver 335. In one embodiment, the voltage/current reference waveform 301 may be a piece-wise waveform descriptor that describes one or more cycles. For example, the reference waveform 301 may describe a voltage/current wave shape in terms of a wave nominal amplitude and period and an indication of whether the cycle is a drive or brake cycle. That is, the drive or brake cycle indication may be encoded together with the voltage waveform stream.

Furthermore, the sequence adjuster 311 uses its parameters to adjust the amplitude and/or period of the reference sequence of the voltage/current reference waveform 301 received from the next sequence under test buffer 309 and provides the adjusted test sequence 312 directly to the driver model 315, and the sequence adjuster 331 uses its parameters to adjust the amplitude and/or period of the reference sequence of the voltage/current reference waveform 301 received from the current sequence to render buffer 329 and drives the selected sequence 332 directly to the driver 335. Still further, the haptic effect estimator 341 takes the measured load voltage and current received from the sensor 339 and outputs an estimation of the haptic effect rendered by the haptic transducer load 337 in the form of a current and bemf of the load 337, which is provided to the compare block 343, which provides the difference between the haptic effect estimate received from the modeled haptic effect estimator 341 and the reference sequence received from the current sequence to render buffer 329 to generate the error signal provided to the error monitor 345.

The modeled haptic effect estimator 321 takes the modeled load voltage and current received from the sensor model 319 and outputs a modeled estimation of the haptic effect rendered by the haptic transducer load model 317 in the form of a load current and bemf, which is provided to the compare and iterate block 323. Finally, the compare and iterate block 323 computes the phase between the current and bemf to adjust the period and polarity of the next test sequence 312. The measurement of the phase between the current and bemf is an estimate of the error 325 towards achieving an exact drive or an exact brake cycle, which is then used to make adjustments. Via the error signal 325, a determination may be made whether the modeled cycle type matches the cycle type indicated in the reference sequence received from the next sequence under test buffer 309. If so, then the selected sequence 332 is played back by the haptic rendering signal chain 330; otherwise, the sequence adjuster 311 adjusts its parameters to generate the test sequence 312 for the next iteration.

In a manner similar to that described above with respect to FIG. 3, each iteration the sequence adjuster 311 may adjust its parameters that it uses to transform the reference sequence 307 based on the error signal 325 received from the compare and iterate block 323. As with FIG. 3, advantageously, the driver model 315 models non-linearities of the driver 335 and the haptic transducer load model 317 models non-linearities of the haptic transducer load 337, and the compare and iterate block 323 and sequence adjuster 311 operate to accomplish iterative modeling based on determination of an acceptable value of the error signal 325 to determine acceptable test sequences 312 for playback by the haptic rendering signal chain 330, which may enable the system 500 to render haptic effect profiles that are reasonably close to the target reference waveform 307, even at high amplitude levels. Additionally, by modeling the haptic rendering signal chain 330 and adjusting the reference waveform 307 in the iterative fashion, the system 500 may advantageously render a more desirable haptic effect. Further advantageously, the buffer 303, sequencer 305 and sequence buffers 309 and 329 may operate to accommodate real-time streaming of the input reference waveform 307 in the presence of the iterative modeling. Finally, the use of the voltage swing of driver 335 may be maximized to advantageously maximize power transfer to the load by directly controlling the amplifier voltage.

Figure 6:
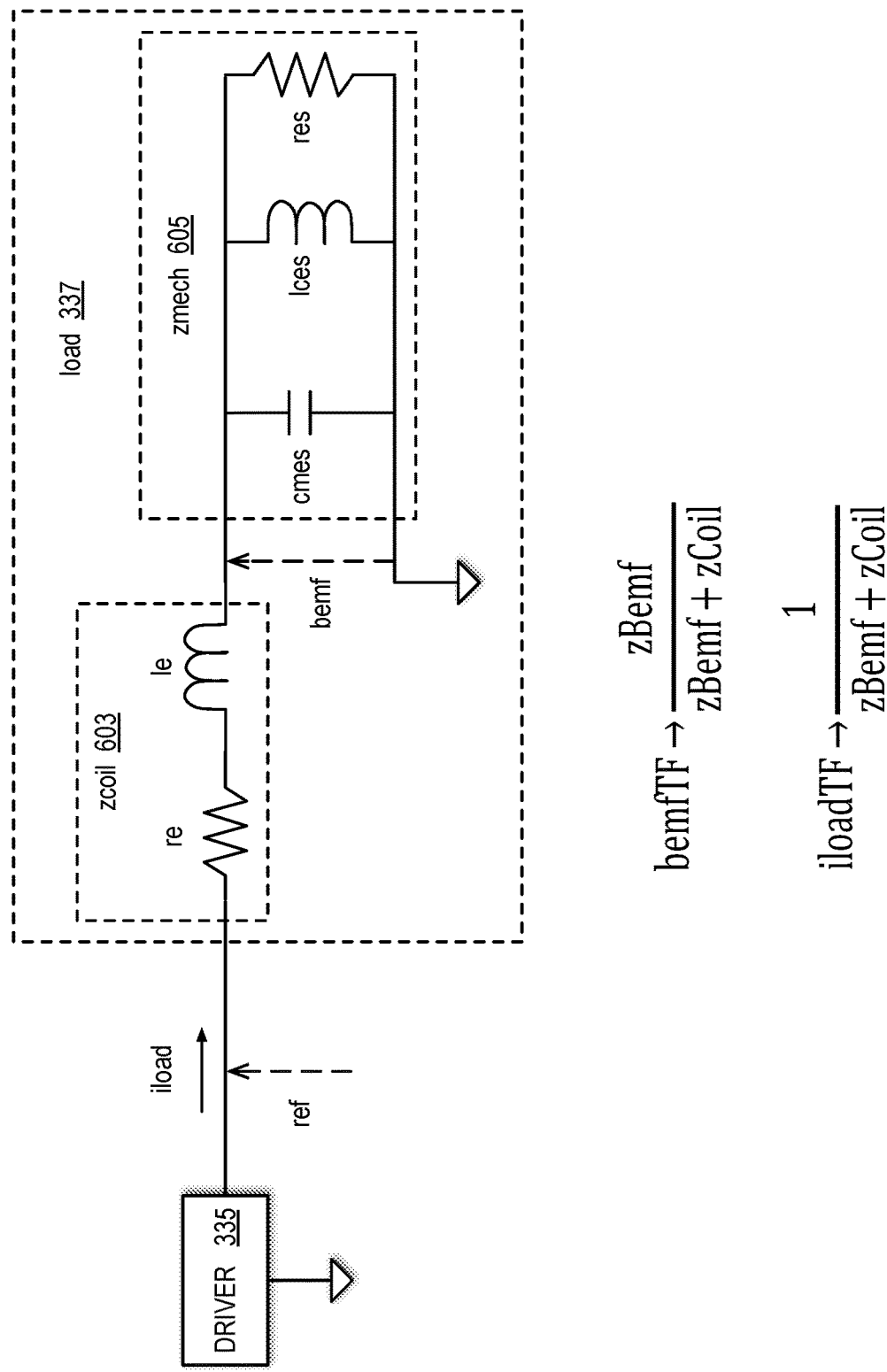
FIG. 6 is a diagram of an electrical circuit equivalent of a haptic transducer load such as those of FIGS. 1 through 5.

FIG. 6 is a schematic diagram of an electrical circuit equivalent of a haptic transducer load such as loads 137 and 337 of FIGS. 1 through 5. The equivalent circuit of FIG. 6 comprises the driver 335 of FIGS. 3 through 5 connected to the haptic transducer load 337. In the example of FIG. 6, the haptic transducer load 337 is an LRA, which is an electromechanical load. The driver 335 produces a reference voltage, ref or driving signal, which appears across the load 337 and induces a load current iload to be drawn by the load 337. The load 337 comprises a coil impedance zcoil, which models the voice coil, and a mechanical impedance zmech, which models the moveable mass and spring arrangement. The coil impedance zcoil is modelled as an inductance le in series with a resistance re. The mechanical impedance zmech appears in series with the coil impedance zcoil and is modelled as a parallel network of a capacitance cmes, an inductance lces, and a resistance res. The capacitance cmes models the magnetic mass, the inductance lces models the spring, and the resistance res models the mechanical damping. The bemf voltage appears across the mechanical impedance zmech as indicated, and the bemf is induced by the moving magnetic mass.

The user haptic experience is defined by sensing the motion of the moving mass, and in particular, the force generated by its acceleration in accordance with Newton's second law. It is desirable therefore to control the acceleration of the moving mass, or a proxy such as the position or velocity of the moving mass, based on which the acceleration can be controlled. It is desirable in particular to control the acceleration to produce one or more of: a) crisp haptic effects, e.g., fast acceleration and braking of the mass, e.g., to simulate clicks or button presses; b) wide bandwidth effects, e.g., for audio-to-haptics or to replicate textures; and c) consistent effects, e.g., from LRA to LRA, or over changing environmental conditions. It is desirable to sharpen the onset of the response of the load 337 to haptic input pulses and to reduce ringing of the load 337 (and e.g., smartphone screen in the context of surface audio/haptic applications) after the haptic input pulse has stopped. The bemf voltage is proportional to the velocity of the moving mass as mentioned above, however the control by the driver circuitry 335 as in FIG. 6 controls the reference voltage ref rather than the bemf voltage itself. Such open loop voltage drive produces the highly resonant performance. In particular, the ref-to-bemf transfer function (bemfTF) of the driven load 337 is set by the voltage divider defined by zcoil and zmech as apparent from the equivalent circuit of FIG. 6. Similarly, the load current transfer function (iloadTF) is set by the series connection of zcoil and zmech. These relationships are expressed in the equations in FIG. 6, where zmech is represented as zBemf and zcoil is represented as zCoil. Because the mechanical system is resonant with high Q (quality factor), and the mechanical impedance is much smaller than the coil impedance (i.e., zmech>>zcoil), the ref-to-bemf transfer function bemfTF has a very narrow bandwidth. The velocity effectively follows zmech (expressed as zBemf) away from resonance (where zbemf<<zcoil) and such driving is in practice only useful for simple vibration effects. To produce much acceleration, the vibration frequency needs to be close to the resonant frequency.

Embodiments of a non-linear predictive model for haptic waveform generation (NLPMHWG) are described. The NLPMHWG may include a model of the plant encompassing any filtering (open-loop or closed-loop), amplifier, actuator, sensors, and any of their non-linear or limiting effects. The NLPMHWG is simulated on a sequence candidate. If the acceleration (or velocity, or position, or other test criterion) produced does not match the expected response, a new candidate sequence is generated and simulated. The process repeats until a candidate sequence produces an acceptable outcome, e.g., acceleration, velocity, position waveform or alignment of load current phase relative to bemf phase. The new candidate sequence may be generated from the reference candidate with a parametric transformation. For instance, the parameters may change the sequence amplitude or time scaling. The reference signal may be an acceleration, velocity (bemf), or position profile, or an amplifier voltage or current profile.

The NLPMHWG components may be updated from an on-line or off-line load model estimator. The estimator may monitor the load current and voltage to determine its impedance and infer the load model parameters. The model components updated may be the load model itself and an equalizer or a closed-loop controller. The NLPMHWG may be coupled with a waveform authoring system that compresses the reference waveform to maximize the haptic response and frequently utilize the full range of the amplifier. The predictive model may be complemented by a monitor circuit that determines the likeness of the actual waveform rendered versus the target waveform. If the result is poor, an error may be triggered either as a debug tool to help design/tune the system or as a means to request the author of the reference signal to modify the signal to achieve a better outcome.

The various functions described herein may be performed by a microcontroller unit (MCU), a digital signal processor (DSP), and/or a dedicated signal processing hardware block, including the functions of the haptic rendering signal chain model. Furthermore, each of the systems may include an integrated circuit that includes the haptic rendering signal chain, simulates the model of the haptic rendering signal chain to generate the test sequences, and sends the selected sequences to the haptic rendering signal chain.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system, comprising:
    a sequencer that divides a reference waveform into reference sequences;
    a sequence adjuster;
    a model of a haptic rendering signal chain, wherein the haptic rendering signal chain includes a haptic transducer load and a driver to the load;
    wherein for each reference sequence of the reference sequences:
        (a) the sequence adjuster transforms the reference sequence into a test sequence using one or more parameters;
        (b) the model generates an output in response to the test sequence;
        (c) an error signal is generated that measures a difference between the output and the reference sequence;
        (d) if the error signal is above a threshold:
            the one or more parameters are adjusted based on the error signal;
        operations (a) through (d) are repeated until the error signal is below the threshold in which case the test sequence becomes a selected sequence; and
        the selected sequence is sent to the haptic rendering signal chain;
    wherein the haptic rendering signal chain further includes a sensor that senses signals comprising a load current and/or a load voltage of the load;
    wherein the model of the haptic rendering signal chain includes a model of the sensor; and
    an estimator that transforms the outputs of the model of the sensor into a signal that estimates a modeled haptic effect rendered by the model of the haptic rendering signal chain in response to each of the test sequences.

2. The system of claim 1,
    wherein the model models non-linearities of the haptic rendering signal chain that include one or more of the following non-linearities:
        driver clipping;
        load current distortion;
        load voltage distortion;
        load excursion limiting;
        force factor distortion; and
        non-linear spring compression.

3. The system of claim 1,
    wherein the reference waveform is one of:
        an acceleration profile;
        a velocity profile;
        a position profile;
        a driver voltage profile; and
        a driver current profile.

4. The system of claim 1, further comprising:
    wherein the load renders a haptic effect in response to the selected sequences;
    wherein the haptic effect is measurable as an acceleration, velocity or position of a mass of the load; and
    wherein the signal that estimates the modeled haptic effect is a representation of one of:
        a back electromotive force (emf) of the load;
        a position of a mass of the load;
        a velocity of a mass of the load; and
        an acceleration of a mass of the load.

5. The system of claim 1,
wherein the haptic rendering signal chain further includes at least one of the following:
an equalizer or other linear filter coupled to an input of the driver that compensates for dynamics of the haptic transducer load and driver; and
a controller coupled to an input of the driver that includes a feedback input based on the one or more sense signals of a sensor of the haptic rendering signal chain that senses signals comprising a load current and/or a load voltage of the load.

6. The system of claim 1, further comprising:
a waveform authoring system that compresses the reference waveform to utilize a full range of the driver.

7. The system of claim 1,
wherein the driver is a class-D amplifier having a class-H control waveform;
wherein the class-H control waveform:
is a parameter of the sequence adjuster; or
is computed a posteriori from a voltage requested by the model of the driver.

8. The system of claim 1,
wherein one or more parameters of the model of the haptic rendering signal chain are updated from an on-line or off-line load model estimator that estimates an impedance of the load;
wherein the load is an electromechanical load; and
wherein the load impedance parameters comprise one or more of:
a resonant frequency of the electromechanical load;
a bandwidth of the electromechanical load;
a resistance and inductance of a coil of the electromechanical load; and
a resonant amplitude of a capacitive-inductive tank of the electromechanical load;
wherein the haptic rendering signal chain further includes an equalizer or a closed-loop controller; and
wherein models of the load and/or the equalizer or the closed-loop controller are updated from the load model estimator.

9. The system of claim 1, wherein the reference waveform is generated by a real-time process and streamed to the system.

10. The system of claim 1,
wherein the system comprises an integrated circuit that:
comprises the haptic rendering signal chain;
simulates the model in real-time to generate the test sequences; and
sends the selected sequences to the haptic rendering signal chain; and
wherein simulation of the model is performed by a microcontroller unit (MCU), a digital signal processor (DSP), and/or a dedicated signal processing hardware block.

11. The system of claim 1,
wherein the load is an electromechanical load.

12. A method for rendering a haptic effect by a haptic rendering signal chain that includes a haptic transducer load and a driver to the load, comprising:
dividing a reference waveform into reference sequences;
for each reference sequence of the reference sequences:
(a) transforming the reference sequence into a test sequence using one or more parameters;
(b) generating, by the model, an output in response to the test sequence;
(c) generating an error signal that measures a difference between the output and the reference sequence;
(d) if the error signal is above a threshold:
adjusting the one or more parameters based on the error signal;
repeating operations (a) through (d) until the error signal is below the threshold in which case the test sequence becomes a selected sequence; and
sending the selected sequence to the haptic rendering signal chain;
wherein the haptic rendering signal chain further includes a sensor that senses signals comprising a load current and/or a load voltage of the load;
wherein the model of the haptic rendering signal chain includes a model of the sensor; and
transforming outputs of the model of the sensor into a signal that estimates a modeled haptic effect rendered by the model of the haptic rendering signal chain in response to each of the test sequences.

13. The method of claim 12,
wherein the model models non-linearities of the haptic rendering signal chain that include one or more of the following non-linearities:
driver clipping;
load current distortion;
load voltage distortion;
load excursion limiting;
force factor distortion; and
non-linear spring compression.

14. The method of claim 12,
wherein the reference waveform is one of:
an acceleration profile;
a velocity profile;
a position profile;
a driver voltage profile; and
a driver current profile.

15. The method of claim 12, further comprising:
wherein the load renders a haptic effect in response to the selected sequences;
wherein the haptic effect is measurable as an acceleration, velocity or position of a mass of the load; and
wherein the signal that estimates the modeled haptic effect is a representation of one of:
a back electromotive force (emf) of the load;
a position of a mass of the load;
a velocity of a mass of the load; and
an acceleration of a mass of the load.

16. The method of claim 12,
wherein the haptic rendering signal chain further includes at least one of the following:
an equalizer or other linear filter coupled to an input of the driver that compensates for dynamics of the haptic transducer load and driver; and
a controller coupled to an input of the driver that includes a feedback input based on the one or more sense signals of a sensor of the haptic rendering signal chain that senses signals comprising a load current and/or a load voltage of the load.

17. The method of claim 12, further comprising:
compressing the reference waveform to utilize a full range of the driver.

18. The method of claim 12,
wherein the driver is a class-D amplifier having a class-H control waveform;
wherein the class-H control waveform:
is a parameter of the sequence adjuster; or
is computed a posteriori from a voltage requested by the model of the driver.

19. The method of claim 12,
wherein one or more parameters of the model of the haptic rendering signal chain are updated from an on-line or off-line load model estimator that estimates an impedance of the load;
wherein the load is an electromechanical load; and
wherein the load impedance parameters comprise one or more of:
- a resonant frequency of the electromechanical load;
- a bandwidth of the electromechanical load;
- a resistance and inductance of a coil of the electromechanical load; and
- a resonant amplitude of a capacitive-inductive tank of the electromechanical load;

wherein the haptic rendering signal chain further includes an equalizer or a closed-loop controller; and
updating, from the load model estimator, models of the load and/or the equalizer or the closed-loop controller.

20. The method of claim 12,
wherein the reference waveform is generated by a real-time process and streamed to the system.

21. The method of claim 12,
wherein the load is an electromechanical load.

* * * * *